Patented Mar. 11, 1930

1,750,067

UNITED STATES PATENT OFFICE

RICHARD STÜSSER, OF COLOGNE-DEUTZ, GERMANY, ASSIGNOR TO GENERAL ANILINE WORKS, INC., OF NEW YORK, N. Y., A CORPORATION OF DELAWARE

AZO DYES

No Drawing. Application filed April 7, 1928, Serial No. 268,378, and in Germany April 21, 1927.

The present invention relates to new azo-dyestuffs of the probable general formula:

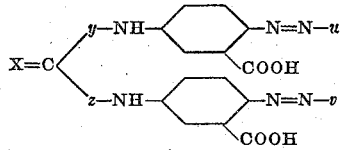

wherein X represents a sulfur or oxygen atom, $u$ and $v$ represent residues of any desired coupling components, $y$ and $z$ stand for at least once a group of the kind $-NH-R-a-$, wherein R represents an aromatic nucleus and $a-$ represents one of the groups $CO-$ and $SO_2-$ being linked to a nitrogen atom.

Such dyestuffs may be prepared for instance by coupling with any desired azo component, the tetrazo-compounds of compounds of the probable general formula:

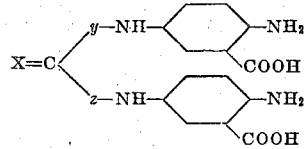

wherein X, $y$ and $z$ are to be explained as mentioned above; or two similar or dissimilar molecules of compounds of the probable general formula:

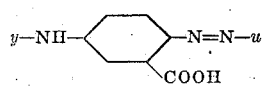

wherein $u$ represents any desired coupling component, $y$ stands for a group of the kind $NH_2-R-a-$, wherein R represents an aromatic nucleus and $a-$ represents one of the groups $CO-$ and $SO_2-$ which are caused to be reacted upon by one molecule of phosgene or thiophosgene; or the compound of the formula:

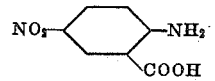

is diazotized, coupled with any desired azo component, reduced, caused to be reacted upon by a compound of the general formula: $NO_2-R-b$, wherein R represents an aromatic nucleus and $b$ stands for $COCl$ or $SO_2Cl$, reduced and then treated with phosgene or thiophosgene.

The dyestuffs thus obtainable may be symmetrical or unsymmetrical ones.

I have found that the symmetrical dyestuffs of these series, especially such ones as contain sulfo-groups in the coupling component and wherein the X mentioned in the first formula stands for O and the group $-NH-R-a-$ means $-NH-R-CO-$, are in many cases of especially high technical value, but it is to be understood that all the dyestuffs as described possess valuable technical properties and in particular have the advantage that the dyeings obtainable by means of them exhibit an increased fastness to water and washing after treatment on the fibre with suitable metal salts. Besides the shade of the dyeings tends by this after-treatment towards yellow or red with the result that an extended range of colors becomes available.

As for the rest the products described above are yellow to black powders sparingly soluble in the usual organic solvents, soluble in concentrated sulfuric acid with yellow to blue colorations, yielding on treatment with stannous chloride and hydrochloride acid among other products 2.5-diaminobenzene-1-carboxylic acid.

The following examples illustrate my invention without limiting it thereto, the parts being by weight:

*Example 1.*—182 parts of 5-nitro-2-aminobenzoic acid are diazotized in water with 69 parts of sodium nitrite and 400 parts of hydrochloric acid of 19.5° Bé., and coupled with 287 parts of acetoacetic acid ortho anisidide sulfonic acid dissolved in a solution rendered alkaline by means of sodium carbonate. 720 parts of crystallized sodium sulfide are then added and stirred with gentle heating until the reduction of the nitro group is complete. The aminoazo dyestuff is salted out and filtered. Thereupon it is re-dissolved in water and condensed with meta-nitro-benzoyl chloride at about 45° C. in the presence of sodium acetate, until the free amino group has disappeared. After rendering the solution alkaline with sodium carbonate, the dyestuff is salted out and filtered. It is re-dissolved in hot water and reduced at about 60° C. with 720 parts of crystallized sodium sulfide. When the reduction is complete the dyestuff is separated by salting out and filtered. The dyestuff is then redissolved in water and converted into the urea or thiourea compound by the treatment at about 45° C. with phosgene or thiophosgene in the presence of sodium acetate, filtered and dried.

The new dyestuff having in its free state the following formula:

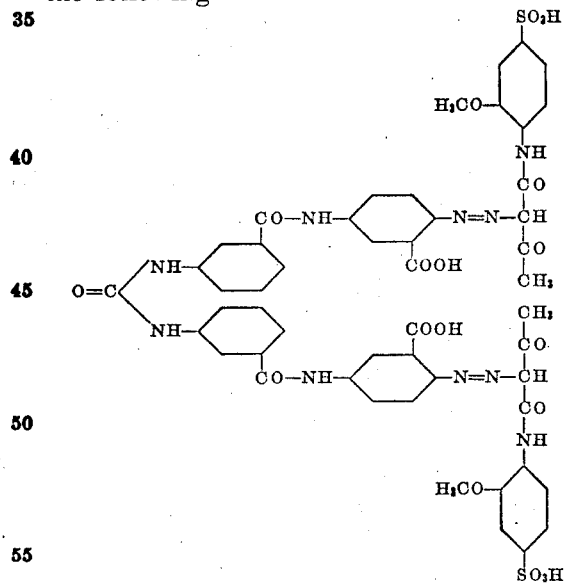

appears as a yellow powder, which dyes unmordanted cotton yellow. After-treatment with metallic salts, in particular with copper salts yields a greenish yellow, fast to water, washing and light.

*Example 2.*—182 parts of 2-amino-5-nitro-benzene-1-carboxylic acid are diazotized in the known manner and coupled with 254 parts of 1-para-sulfo-phenyl-3-methyl-5-pyrazolone, dissolved in the presence of acetic acid. The solution is then rendered alkaline with sodium carbonate, and the nitroazo dyestuff is reduced to the aminoazo dyestuff by means of 720 parts of crystallized sodium sulfide. The dyestuff is separated in the customary manner, filtered and re-dissolved in water, whereupon it is condensed with meta-nitro-benzoyl chloride until the free amino group can no longer be detected. The meta-nitro-benzoyl-aminoazo dyestuff is filtered and converted into the meta-aminobenzoyl-aminoazo dyestuff by means of 720 parts of crystallized sodium sulfide, the urea compound being produced in the known manner in the presence of sodium acetate or sodium carbonate. The dyestuff thus obtained has the probable formula:

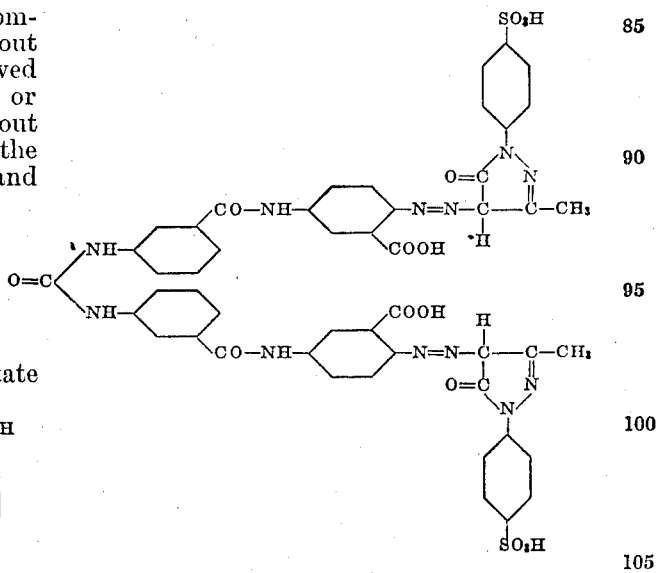

and appears as a yellowish brown powder which dyes unmordanted cotton orange. By after treatment with coppersalts, a brownish yellow is obtained, fast to washing and light. The dyestuff yields, when reduced with stannous chloride and hydrochloric acid, 2.5-di-amino-benzene-1-carboxylic acid, 3-amino-benzene-1-carboxylic acid and 1-p-sulfophenyl-3-methyl-4-aminio-5-pyrazolone.

*Example 3.*—The azo dyestuffs, obtained in the known manner from 182 parts of 2-amino-5-nitro-benzene-1-carboxylic acid and 306 parts of 6′-sulfo-1-β-naphthyl-3-methyl-5-pyrazolone, is reduced by means of 720 parts of crystallized sodium sulfide in 200 parts of caustic soda solution of 38° Bé. and condensed with 3-nitro-4-methoxy-benzoic acid chloride. The condensation product is reduced by means of 720 parts of crystallized sodium sulfide, and the reduction product is converted in the known manner into the urea compound.

The dyestuff thus obtained having in its free state the following formula:

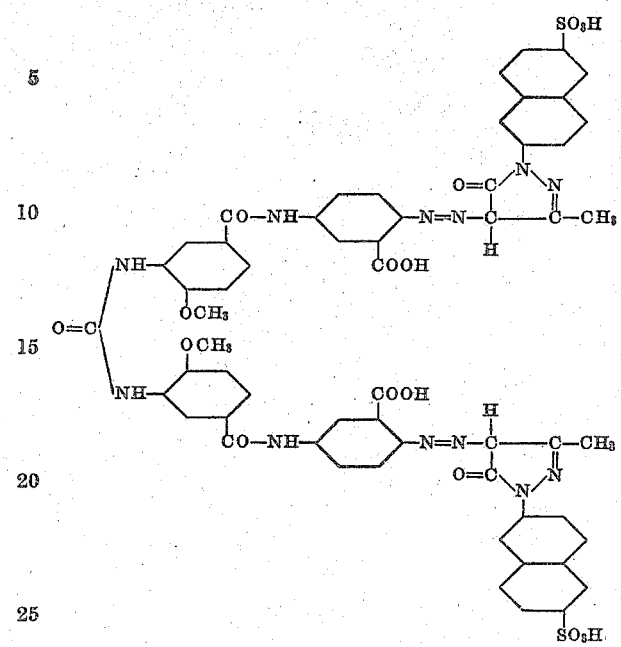

dyes unmordanted cotton an orange shade, which by after-treatment with copper or cobalt salts changes to a yellowish brown, fast to washing and light.

*Example 4.*—The dyestuff obtained from 182 parts of 2-amino-5-nitro-benzene-1-carboxylic acid and 224 parts of 1-naphthol-4-sulfonic acid is reduced by means of 720 parts of crystallized sodium sulfide and condensed with meta-nitro-benzoyl chloride, then reduced to the aminobenzoylaminoazo dyestuff by means of 720 parts of crystallized sodium sulfide and converted into the urea compound having in its free state the following formula:

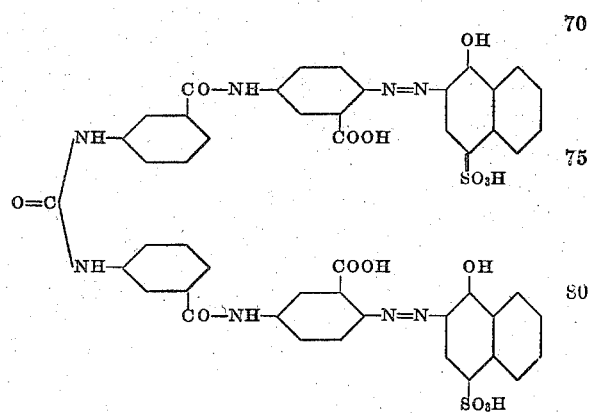

In this manner a dyestuff is obtained which dyes unmordanted cotton a blueish red. By after treatment of the dyeing with copper salts a Bordeaux red is obtained, fast to washing and light.

*Example 5.*—The meta-aminobenzoyl-aminoazo dyestuff obtained as described in Example 4 is condensed with 3-nitro-4-methoxy-benzoic acid chloride, until the free amino group can no longer be detected. The condensation product is reduced by means of 720 parts of crystallized sodium sulfide and the 3-amino-4-methoxybenzoyl-meta-aminobenzoylaminoazo dyestuff is then converted in the known manner into the urea compound having in its free state the following formula:

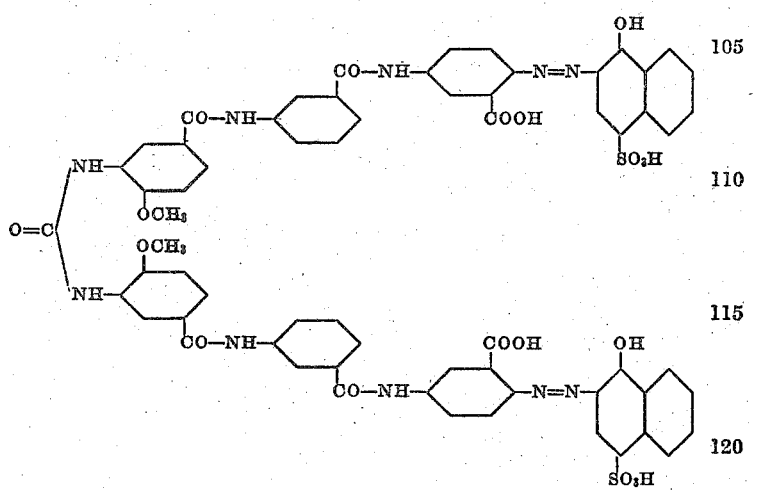

In this manner also a dyestuff is obtained, which dyes unmordanted cotton a bluish red. On aftertreatment with copper salts the dyeing becomes a Bordeaux red.

*Example 6.*—The dyestuff obtained from 182 parts of diazotized 2-amino-5-nitro-benzene-1-carboxylic acid and 348 parts of 1-ethoxy-8-hydroxy-naphthalene-3.6-disulfonic acid is reduced to the aminoazo dyestuff by means of 720 parts of crystallized sodium sulfide and condensed with meta-nitrobenzoyl chloride until the free amino group can no longer be detected. The meta-nitrobenzoylaminoazo dyestuff is then reduced to the meta-aminobenzoylaminoazo dyestuff and the latter is converted into the urea compound having in its free state the following formula:

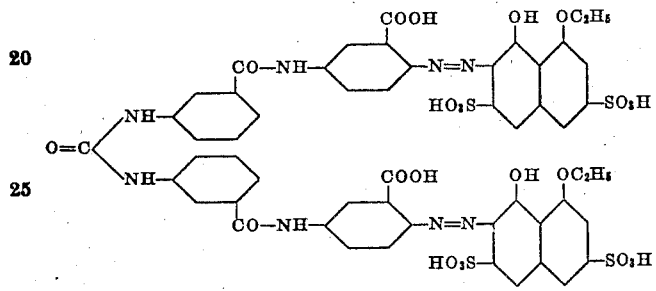

The dyestuff thus obtained dyes unmordanted cotton a blueish red, which on after-treatment with copper salts changes to a reddish violet.

*Example 7.*—The dystuff obtained from 182 parts of diazotized 2-amino-5-nitro-benzene-1-carboxylic acid and 361 parts of 1-acetylamino-8-naphthol-3.6-disulfonic acid is reduced as above described and condensed with meta-nitrobenzoyl chloride, then again reduced and converted into the urea compound having in its free state the following formula:

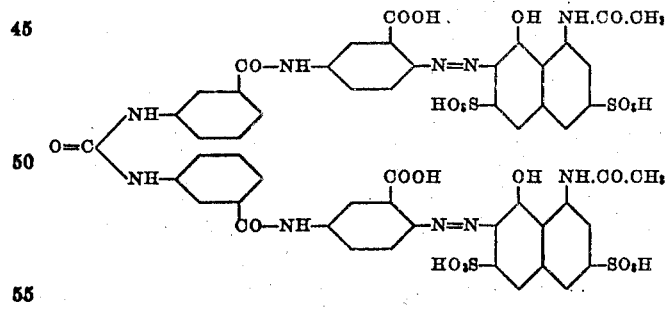

In this manner, a dyestuff is obtained which dyes unmordanted cotton a reddish violet, which on after-treatment with copper salts changes to a clear violet.

I claim:

1. Azodyestuffs of the probable general formula:

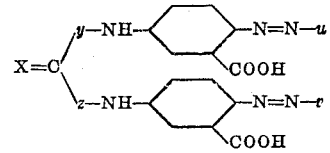

wherein X represents a sulfur or oxygen atom, $u$ and $v$ represent residues of any desired coupling components, $y$ and $z$ stand for at least once a group of the kind $-NH-R-a-$, whereby R represents an aromatic nucleus and $a-$ represents one of the groups $CO-$ and $SO_2-$ being linked to a nitrogen atom, said dyestuffs being yellow to black powders, sparingly soluble in the usual organic solvents, soluble in concentrated sulfuric acid with yellow to blue colorations, yielding on treatment with stannous chloride and hydrochloric acid among other products 2.5-diaminobenzene-1-carboxylic acid.

2. Azodyestuffs of the probable general formula:

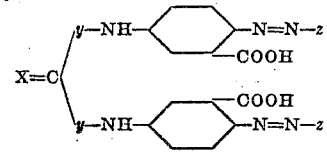

wherein X stands for a sulfur or oxygen atom, the two $z$'s represent residues of any desired azocomponents and the two $y$'s stand for the group $-NH-R-CO-$, whereby R means an aromatic nucleus, said dyestuffs being yellow to black powders, sparing soluble in the usual organic solvents, soluble in concentrated sulfuric acid with yellow to blue colorations, yielding on treatment with stannous chloride and hydrochloric acid among other products 2.5 - diaminobenzene - 1 - carboxylic acid.

3. Azodyestuffs of the probable general formula:

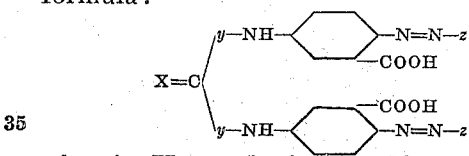

wherein X stands for a sulfur- or oxygen atom, the two $z$'s represent residues of any desired coupling components containing sulfogroups, the two $y$'s stand for the group, $-NH-R-CO-$, whereby R represents a benzene nucleus, said dyestuffs being yellow to black powders, sparingly soluble in the usual organic solvents, soluble in concentrated sulfuric acid with yellow to blue colorations, yielding on treatment with stannous chloride and hydrochloric acid among other products 2.5 - diaminobenzene - 1 - carboxylic acid and an aminobenzoic acid.

4. Azodyestuffs of the probable general formula:

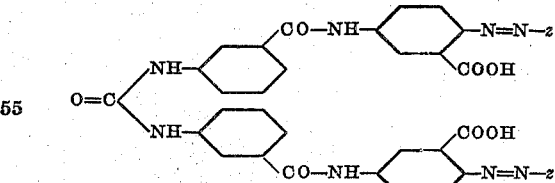

wherein the two $z$'s represent residues of any desired azocomponents containing sulfogroups, said dyestuffs being yellow to black powders, sparingly soluble in the usual organic solvents, soluble in concentrated sulfuric acid with yellow to blue colorations, yielding on treatment with stannous chloride and hydrochloric acid among other products 2.5-diamino-benzene-1-carboxylic acid and 3-aminobenzene-1-carboxylic acid.

5. The disazodyestuff having in its free form the probable formula:

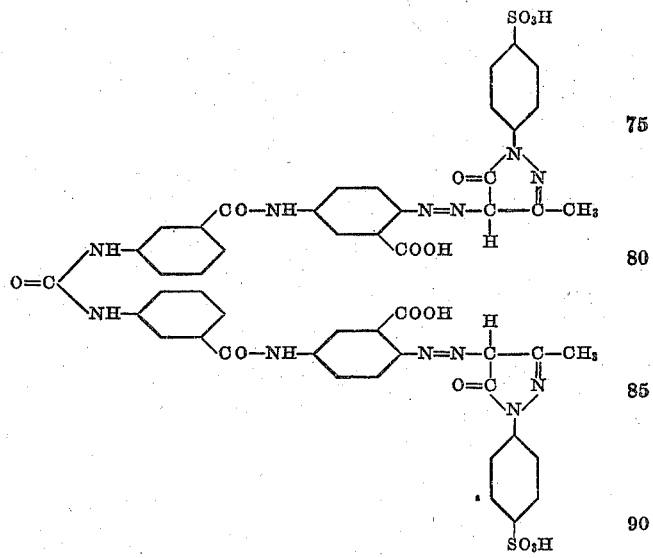

said dyestuff being in form of its sodium salt a yellowish brown powder, soluble in water and sulfuric acid with a yellow coloration, dyeing cotton orange shades which change to brownish yellow by after-treatment with copper salts, yielding on reduction with stannous chloride and hydrochloric acid 2.5-diaminobenzene-1-carboxylic acid, 3-aminobenzene-1-carboxylic acid and 1-p-sulfophenyl-3-methyl-4-amino-5-pyrazolone.

In testimony whereof I have hereunto set my hand.

RICHARD STÜSSER.